United States Patent [19]

Wagner

[11] Patent Number: 4,474,424

[45] Date of Patent: Oct. 2, 1984

[54] OPTICAL MULTI/DEMULTIPLEXER USING INTERFERENCE FILTERS

[75] Inventor: Richard E. Wagner, Fair Haven, N.J.

[73] Assignee: AT&T Bell Laboratories, Murray Hill, N.J.

[21] Appl. No.: 246,106

[22] Filed: Mar. 20, 1981

[51] Int. Cl.³ .............................................. G02B 5/14
[52] U.S. Cl. ............................................... 350/96.16
[58] Field of Search ............... 350/96.15, 96.16, 96.17, 350/96.18, 96.19, 164

[56] References Cited

U.S. PATENT DOCUMENTS

| | | | |
|---|---|---|---|
| 4,111,524 | 9/1978 | Tomlinson | 350/96.19 |
| 4,208,094 | 6/1980 | Tomlinson et al. | 350/96.16 X |
| 4,243,297 | 1/1981 | Elion | 350/96.15 |
| 4,300,811 | 11/1981 | Ettenberg et al. | 350/96.15 X |
| 4,341,438 | 7/1982 | Seki et al. | 350/96.16 |

FOREIGN PATENT DOCUMENTS

| | | | |
|---|---|---|---|
| 114251 | 9/1979 | Japan | 350/96.15 |
| 35346 | 3/1980 | Japan | 350/96.15 |
| 121403 | 9/1980 | Japan | 350/96.18 |
| 17305 | 2/1981 | Japan | 350/96.15 |
| 382041 | 8/1973 | U.S.S.R. | 350/164 |

OTHER PUBLICATIONS

Mahlein et al., *Electronics Letters*, vol. 16, No. 15, Jul. 17, 1980, pp. 584-585, "Interference Filter All-Fiber Directional Coupler . . . ".
Tanaka et al., *Electronics Letters*, vol. 16, No. 23, Nov. 6, 1980, pp. 869-870, "Simple Structure High Isolation Multi/Demultiplexer".
Hashimoto et al., Optical Communication Conference (5th European Conference on Optical Communication), Amsterdam, Sep. 17-19, 1979, "Low-Loss Optical Multi/Demultiplexer Using Interference Filters", pp. 11.5-1-11.5-3.

*Primary Examiner*—John D. Lee
*Assistant Examiner*—Frank González
*Attorney, Agent, or Firm*—Volker R. Ulbrich

[57] ABSTRACT

The disclosed multiplexer/demultiplexer (10, 40) features input and output optical fibers (20, 22, 24, 42, 44, 46, 48, 50) coupled to one face (16) of a graded refractive index rod collimating lens (12). Associated with the other face (18) of the lens (12) are a plurality of multilayer dielectric interference filters (26, 32, 52, 54, 56, 58) which selectively reflect the input signals at different angles according to the wavelength and thereby direct them back through the lens (12) to the appropriate output fiber.

1 Claim, 3 Drawing Figures

OPTICAL MULTI/DEMULIPLEXER USING INTERFERENCE FILTERS

BACKGROUND OF THE INVENTION

The present invention relates to optical multi/demultiplexers, particularly those for use with optical fibers.

In optical communications systems there is a need for multiplexing different wavelength signals from a plurality of optical fibers into a single fiber and vice versa. Among the important considerations for a device performing such a function is its complexity, its insertion loss, and its cross talk.

One type of optical fiber multi/demultiplexer device is described in the U.S. Pat. No. 4,111,524 issued Sept. 5, 1978, to Tomlinson. In this device a GRIN (graded refractive index)-rod lens collimates different wavelength light signals from signal source fibers on one face to its other face. A reflective diffraction grating is spaced from the other face at such an angle that the different wavelength components of the source signals are differentially reflected back into the GRIN-rod to emerge at the first face at an output location, where they now pass in multiplexed form into a single receptor fiber. The nature of this arrangement, however, is such that the fiber geometry itself limits the channel spacing and bandwidth.

Other multi/demultiplexer devices which have been described involve multilayer dielectric interference filters in conjunction with lenses in various configurations, such as for example the structure described in "Low-Loss Optical Multi/demultiplexer Using Interference Filters," *Optical Communication Conference*, Amsterdam, Sept. 17-19, 1979, pp. 11.5-1-11.5-3. These devices, however, are more complex and bulky than the above reflective grating device.

SUMMARY OF THE INVENTION

With the novel device of the present invention, optical signal transmission elements coupled to a first face of a lens are coupled together in a wavelength-selective manner by means of at least one reflective filter spaced from the second face of the lens and adapted to reflect a first wavelength $\lambda_1$ signal to couple it from one to another of the elements while transmitting at least a second wavelength $\lambda_2$ signal. The second wavelength $\lambda_2$ signal is reflected by a reflector back through the first filter and the lens to also couple it between one and another of the transmission elements. The optical axes of the filters are non-parallel to each other. A plurality of filters can be arranged to wavelength-selectively couple several or more different wavelength signals between transmission elements.

With this arrangement there is a relatively low insertion loss. The channel spacing and the bandwidth are dependent on the characteristics of the filter, and are independent of the fiber geometry. Moreover, the transmission elements are coupled to only one face of the lens, thereby providing economy of space in packaging the apparatus.

PREFERRED EMBODIMENT

Figure 1:
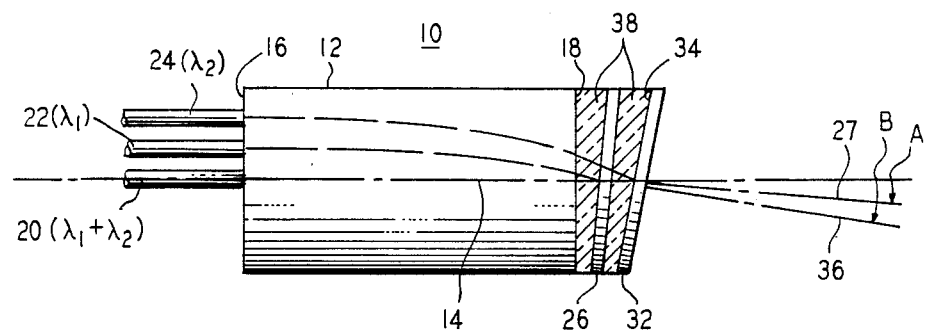
FIG. 1 is a schematic front view of a two channel multi/demultiplexer in accordance with one embodiment of the present invention.

The multiplexer/demultiplexer device 10 of FIG. 1 is designed to convert two different wavelength source signals $\lambda_1$ and $\lambda_2$ to a single wavelength-division multiplexed signal $\lambda_1 + \lambda_2$. The device 10 includes a quarter-pitch GRIN-rod lens 12 having an optical axis 14, a first face 16 and a second face 18. Optically coupled to the first face 16 are optical signal transmission elements in the form of a multiplexed signal fiber 20 and first and second separate wavelength signal fibers 22, 24. An interference filter 26 is spaced from the second face 18 of the lens 12 with its optical axis 27 tilted at a first angle A to the optical axis 14 of the lens. Spaced from the filter 26 on the side remote from the second face 18 of the lens 12 there is a second, reflective filter 32 with a reflective face 34 having an optical axis 36 tilted at a second angle B with respect to the lens axis 14.

The filters 26, 32 can be commercially available dichroic band separation filters. Suitable characteristics, for example, are a lower wavelength band of $0.806\mu$ (micrometers) to $0.845\mu$, an upper wavelength band of $0.866\mu$ to $0.895\mu$, and a transmission of greater than 80 percent for whichever band is passed.

For the particular device 10 of the preferred embodiment, the first filter 26 is constructed to reflect a first optical signal with a $0.82\mu$ wavelength and to pass a second optical signal with a $0.875\mu$ wavelength with a transmission of at least 80 percent. This arrangement provides for a channel bandwidth greater than $0.04\mu$ and a 0.55 micron channel spacing.

The second filter 32 functions as a reflector of whatever wavelength signal component passes through the first filter 26, and therefore can also be a reflector with no filtering capability. However, it is presented here as a reflective filter to facilitate the description of other embodiments by making clearer the structures they have in common.

In a multiplexing mode of the device 10, the first and second optical signals $\lambda_1$ and $\lambda_2$ from the first and second wavelength signal fibers 22, 24 pass into and through the lens 12 to emerge as collimated light from the second face 18 and travel to the first filter 26, as shown by the central rays in FIG. 1. The first wavelength signal component $\lambda_1$ of the light is almost entirely reflected at the angle 2A relative to the axis 14 of the lens 12. It passes back into the lens 12 and enters the multiplexed signal fiber 20. The second wavelength signal component $\lambda_2$ of the light signal is transmitted by the first filter 26 and reflected by the second filter 32 at the angle 2B relative to the axis 14 of the lens 12 to pass back through the first filter 26 and the lens 12 to the multiplexed signal fiber 20, thus resulting in a wavelength-division multiplexing of the first and second signals in the fiber 20.

It is readily seen that the device 10 also performs as a demultiplexer. If a wavelength-division multiplexed optical signal of first and second different wavelength signal components $\lambda_1 + \lambda_2$ is supplied by the multiplexed signal fiber 20, it will pass through the lens 12 and to the first filter 26. The first wavelength component $\lambda_1$ will be reflected by the first filter 26 to pass back through the lens 12 and into the first signal fiber 22. The second component $\lambda_2$ will be transmitted by the first filter 26 and reflected by the second filter 32 to pass back through the filter 26 and the lens 12 into the second signal fiber 24.

It is apparent from consideration of the structure of the device 10 as described above that additional fibers and filters may be added to the device 10, all at different angular orientations with respect to the optical axis 14, to increase the number of multiplexed channels. By structuring the additional filters to have the appropriate wavelength selectivity, it is possible to wavelength-selectively couple as desired a plurality of different wavelength input signals, with the major limitation being the insertion loss.

For both the device 10 and for a device with more than two channels, the alignments of the optical elements in manufacturing can be simplified by the provision of transparent wedges, such as the wedges 38 in FIG. 1, cemented between the optical elements with optical cement which matches the index of refraction of the adjoining elements.

Figure 2:
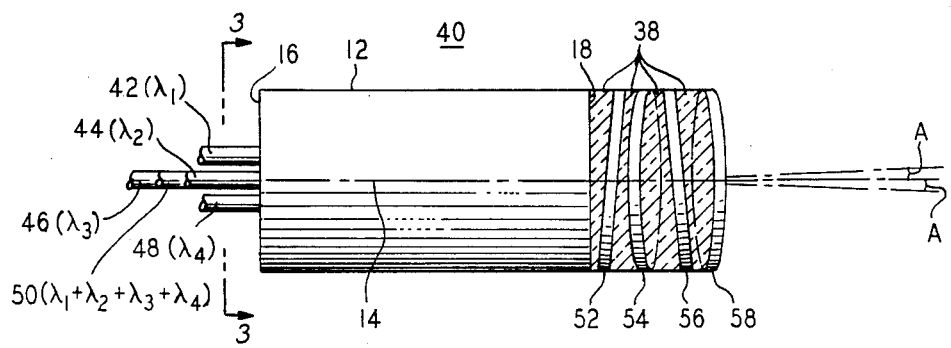
FIG. 2 is a schematic front view of a four channel multi/demuliplexer in accordance with another embodiment of the invention.
Figure 3:
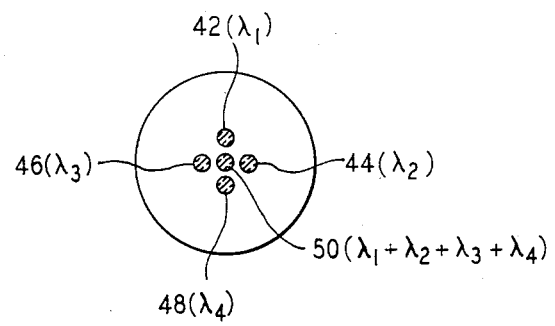
FIG. 3 is an end view of the multiplexer/demultiplexer of FIG. 2 showing the orientation of optical fibers which carry signals.

In FIG. 2 there is shown another embodiment of the invention in the form of the device 40 designed for four-channel multi/demultiplexing of light signals $\lambda_1$, $\lambda_2$, $\lambda_3$, and $\lambda_4$. Here the first lens face 16 of the GRIN rod lens 12 has coupled to it the ends of four separate signal fibers 42, 44, 46, 48 which carry, respectively, the signals $\lambda_1$, $\lambda_2$, $\lambda_3$, and $\lambda_4$ and additionally has coupled to it a centrally disposed multiplexed signal fiber 50. The positions of the fibers 42, 44, 46, 48, 50 are separately shown in FIG. 3. Spaced from the second lens face 18 are four reflective filters 52, 54, 56, 58 which are each oriented slightly tilted at angle A with respect to the lens axis 14 to the same degree but in different directions angularly spaced from each other by 90 degrees. The angle A is such that the light signal wavelength components $\lambda_1$, $\lambda_2$, $\lambda_3$, and $\lambda_4$ are selectively reflected by the filters 52, 54, 56, 58, respectively, to result in optical coupling to the multiplexed signal fiber 50 in a fashion similar to the coupling of the device of FIG. 1. The advantage of having the filters 52, 54, 56, 58 arranged tilted in different directions is that this permits the angle A to be minimized. This results in the least amount of offset of the light signals $\lambda_1$, $\lambda_2$, $\lambda_3$, $\lambda_4$ at the second lens face 18 and thereby reduces signal losses and prevents polarization effects from influencing the wavelength-selective properties of the filters. As in the device 10, the filters 52, 54, 56, 58 are conveniently fixed in position by being cemented to transparent wedges 38.

The above-described devices 10, 40 provide wavelength-selective coupling between optical signal transmission elements at the first lens face 16. These elements may be single or multi-mode optical fibers and may also be combinations of other optical elements, such as photo-emitters and photodetectors. It is apparent that the optical signal transmission elements can be coupled to the first lens face 16 in various configurations, provided the respective filters for coupling them are positioned accordingly to reflect the signals between pairs as desired. The multiplexed signal fibers (20, 50) need not be located at the axis 14. For the device 10, for example, it may be preferable to have the second filter 32 parallel to the second lens face 18 and to then have the first filter 26 at a lesser angle of tilt to reduce the offset. The fibers 20, 22, 24 would need to be positioned accordingly. In any case, the filters are non-parallel to each other.

While the filters of the devices 10, 40 are of a long-wavelength-pass type, they may also be short-wavelength-pass or band-pass types.

What is claimed is:

1. A device comprising:
   a graded refractive index optical lens having first and second faces and an optical axis;
   a multiplexed signal optical transmission fiber optically coupled to the center of the first face of said lens;
   a plurality of individual signal optical transmission fibers optically coupled to the first face of said lens in a configuration about said multiplexed signal fiber;
   a plurality of multilayer dielectric reflective interference filters spaced progressively from the second face of said lens and each fixed in a position tilted with respect to the second face at equal angles and in different directions corresponding to the configuration of said individual signal fibers, each of said filters being capable of transmitting signals of a wavelength which is reflected by others of said filters, and
   transparent wedges between each of said filters and its adjacent optical element fixing the relative spacing and orientation.

* * * * *